US012030745B2

(12) United States Patent
Kato et al.

(10) Patent No.: US 12,030,745 B2
(45) Date of Patent: Jul. 9, 2024

(54) ELEVATOR DEVICE

(71) Applicant: Mitsubishi Electric Corporation, Tokyo (JP)

(72) Inventors: Takehiro Kato, Tokyo (JP); Yasuo Watanabe, Tokyo (JP); Taiki Morikura, Tokyo (JP); Yoshinao Takahashi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 3 days.

(21) Appl. No.: 17/617,002

(22) PCT Filed: Jun. 17, 2019

(86) PCT No.: PCT/JP2019/023905
§ 371 (c)(1),
(2) Date: Dec. 7, 2021

(87) PCT Pub. No.: WO2020/255208
PCT Pub. Date: Dec. 24, 2020

(65) Prior Publication Data
US 2022/0169482 A1 Jun. 2, 2022

(51) Int. Cl.
*B66B 7/04* (2006.01)

(52) U.S. Cl.
CPC .................................... *B66B 7/04* (2013.01)

(58) Field of Classification Search
CPC ........... B66B 7/04; B66B 7/046; B66B 7/047; B66B 7/048; B66B 11/0286; B61F 9/00
See application file for complete search history.

(56) References Cited

U.S. PATENT DOCUMENTS

| | | | | |
|---|---|---|---|---|
| 1,003,566 A * | 9/1911 | Winters | B66B 7/047 | 187/409 |
| 1,087,773 A * | 2/1914 | Johnson | B61F 9/00 | 104/246 |
| 4,750,590 A * | 6/1988 | Otala | B66B 7/043 | 187/409 |

(Continued)

FOREIGN PATENT DOCUMENTS

| | | | |
|---|---|---|---|
| CN | 201144130 Y | 11/2008 | |
| CN | 104870354 A * | 8/2015 | B66B 5/02 |

(Continued)

OTHER PUBLICATIONS

Japanese Office Action issued Aug. 2, 2022 in corresponding Japanese Patent Application No. 2021-528060 (with machine-generated English translation), 8 pages.

(Continued)

*Primary Examiner* — Minh Truong
(74) *Attorney, Agent, or Firm* — XSENSUS LLP

(57) ABSTRACT

An elevator device includes a guide rail (1), a car (3), and a guide device (4). The car (3) is movable in a horizontal direction at a specific height. The guide device (4) includes a supporting member (11) and a guide member (12). The guide member (12) is displaceable to a first position for restricting movement of the car (3) in the horizontal direction and guiding up-down movement of the car (3) and a second position where the guide member (12) does not come into contact with the guide rail (1) when the car (3) moves in the horizontal direction.

7 Claims, 13 Drawing Sheets

(56) References Cited

U.S. PATENT DOCUMENTS

| | | | | | |
|---|---|---|---|---|---|
| 5,151,562 | A * | 9/1992 | Fujita | B66B 7/047 187/394 |
| 11,834,300 | B2 * | 12/2023 | Duvall | B66B 7/042 |
| 2006/0260878 | A1 | 11/2006 | Hashiguchi | |
| 2011/0168500 | A1 * | 7/2011 | Rossignol | B66B 9/00 187/406 |
| 2018/0086599 | A1 * | 3/2018 | Hess | B66B 7/048 |

FOREIGN PATENT DOCUMENTS

| | | | | | |
|---|---|---|---|---|---|
| CN | 107381287 | A | | 11/2017 | |
| JP | H08151179 | A | * | 6/1996 | B66B 7/046 |
| JP | 2555419 | B2 | * | 11/1996 | B66B 7/047 |
| JP | 2006-225052 | A | | 8/2006 | |
| JP | 2007269442 | A | * | 10/2007 | B66B 7/046 |
| JP | 2015009907 | A | * | 1/2015 | |
| KR | 20190136598 | A | * | 12/2019 | B66B 7/048 |
| WO | 2005/121007 | A1 | | 12/2005 | |
| WO | WO-2006006228 | A1 | * | 1/2006 | B66B 11/0206 |

OTHER PUBLICATIONS

International Search Report and Written Opinion mailed on Aug. 6, 2019, received for PCT Application PCT/JP2019/023905, Filed on Jun. 17, 2019, 10 pages including English Translation.

* cited by examiner

ELEVATOR DEVICE

CROSS-REFERENCE TO RELATED APPLICATION

The present application is based on PCT filing PCT/JP2019/023905, filed Jun. 17, 2019 the entire contents of which are incorporated herein by reference.

FIELD

The present invention relates to an elevator device.

BACKGROUND

PTL 1 describes an elevator device. The elevator device described in PTL 1 includes a plurality of cars. The cars move up and down in a shaft. The cars move in a horizontal direction as well at a specific height.

CITATION LIST

Patent Literature

[PTL 1] JP 2006-225052 A

SUMMARY

Technical Problem

In an elevator device, movement of a car is guided by a guide device provided on the car and a guide rail provided in a shaft. In the elevator device described in PTL 1, movement of the car in the horizontal direction is enabled by rotating the guide rail. However, in such an elevator device, mechanisms for rotating the guide rail have to be provided at all heights for moving the car in the horizontal direction. Therefore, there is a problem in that a period and expenses for construction increase.

The present invention is made in order to solve the problem described above. An object of the present invention is to provide an elevator device that can reduce a period and expenses for construction and can bring a car into a movable state in a horizontal direction.

Solution to Problem

An elevator device of the present invention comprises a guide rail provided in a shaft, a car that moves up and down in the shaft along the guide rail, and a guide device provided on the car to be opposed to the guide rail. The car is movable in a horizontal direction at a specific height. A first side surface and a second side surface facing opposite directions each other and an end face are formed in the guide rail. The guide device includes a supporting member fixed to the car, and a guide member supported by the supporting member. The guide member is displaceable to a first position where the guide member is opposed to the end face, the first side surface, and the second side surface of the guide rail to thereby restrict movement of the car in the horizontal direction and guide up-down movement of the car, and a second position where the guide member does not come into contact with the guide rail when the car moves in the horizontal direction.

Advantageous Effects of Invention

With the elevator device according to the present invention, it is possible to reduce a period and expenses for construction and bring a car into a movable state in a horizontal direction.

DESCRIPTION of EMBODIMENTS

The present invention is described with reference to the accompanying drawings. Redundant descriptions are simplified or omitted as appropriate. In the figures, the same reference signs indicate the same or corresponding portions.

First Embodiment

Figure 1:
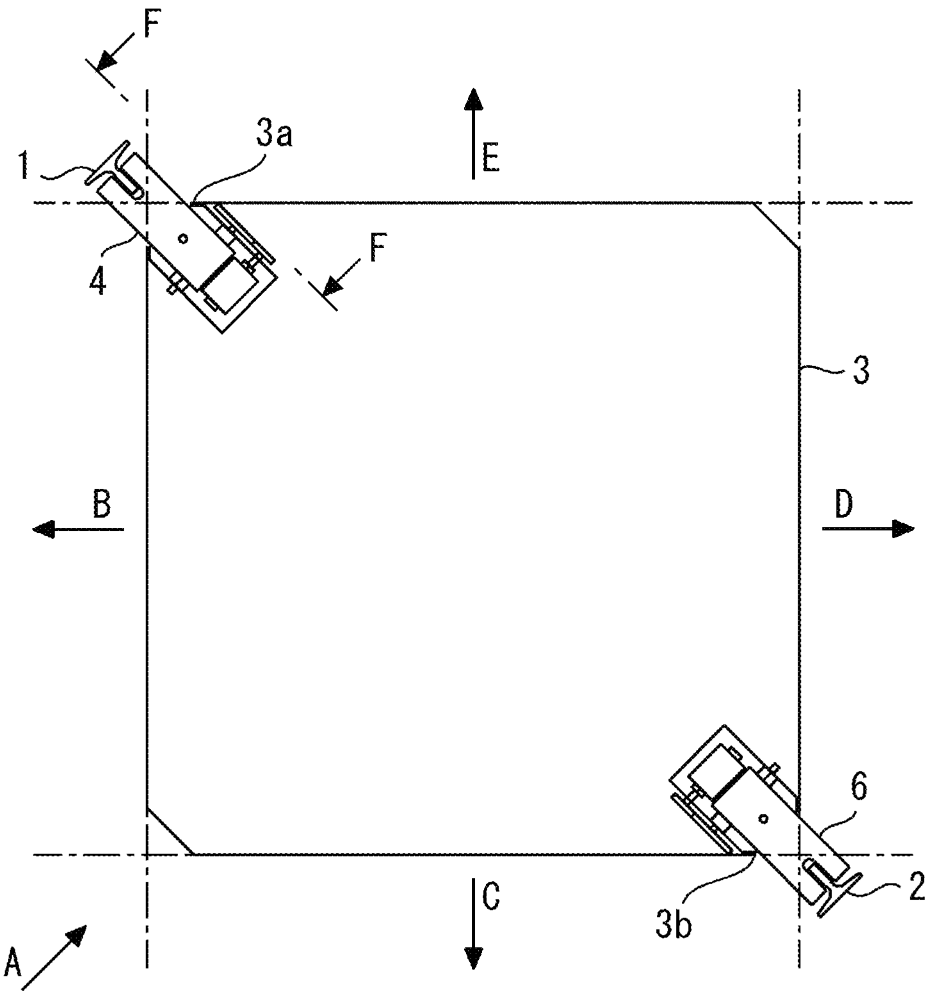
FIG. 1 is a plan view showing an example of an elevator device in a first embodiment.
Figure 2:
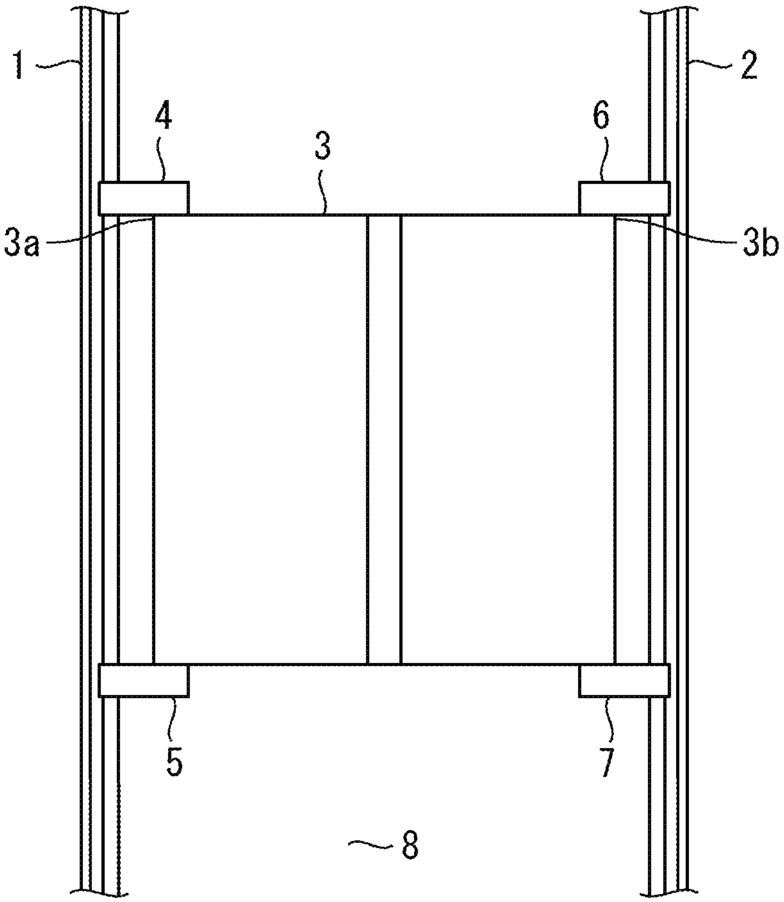
FIG. 2 is a diagram of the elevator device shown in FIG. 1 viewed from an A direction.

FIG. 1 is a plan view showing an example of an elevator device in a first embodiment. FIG. 2 is a diagram of the elevator device shown in FIG. 1 viewed from an A direction. The elevator device includes, for example, guide rails 1 and 2, a car 3, and guide devices 4 to 7.

The guide rail 1 is provided in a shaft 8. The guide rail 1 is linearly arranged from a pit to a top of the shaft 8. The guide rail 2 is provided in the shaft 8 to be opposed to the guide rail 1 at a fixed interval. The guide rail 2 is linearly arranged from the pit to the top of the shaft 8.

The car 3 is arranged between the guide rail 1 and the guide rail 2. The car 3 moves up and down in the shaft 8 along the guide rails 1 and 2. A user rides on the car 3 to move from a certain floor to another floor. A method for driving the car 3 may be any method.

In an example described in this embodiment, the car 3 is movable in a horizontal direction as well at least at a specific height. The car 3 may be able to move in the horizontal direction at a plurality of heights. The car 3 may be able to move in the horizontal direction at any height. A method for driving the car 3 in the horizontal direction may be any method. For example, the car 3 can move in at least any one direction among B to E directions shown in FIG. 1. The car 3 may be able to move in all of the B to E directions.

The guide devices 4 to 7 are provided on the car 3. The guide devices 4 to 7 may be provided on a member forming a boarding space in the car 3 or may be provided on a frame member supporting the member forming the boarding space. The guide devices 4 to 7 may be provided on another member included in the car 3.

The guide device 4 is provided on an upper part of the car 3. In the example described in this embodiment, as shown in FIG. 1, the car 3 has a square shape having four corners in a plan view. The guide device 4 is provided at one corner 3*a* of the square shape. The guide device 4 is opposed to the guide rail 1.

The guide device 5 is provided on a lower part of the car 3. The guide device 5 is placed right below the guide device 4. The guide device 5 is opposed to the guide rail 1.

The guide device 6 is provided on the upper part of the car 3. The guide device 6 is provided at another one corner 3*b* of the square shape. The corner 3*b* is the opposite corner of the corner 3*a*. The guide device 6 is opposed to the guide rail 2.

The guide device 7 is provided on the lower part of the car 3. The guide device 7 is placed right below the guide device 6. The guide device 7 is opposed to the guide rail 2.

Figure 3:
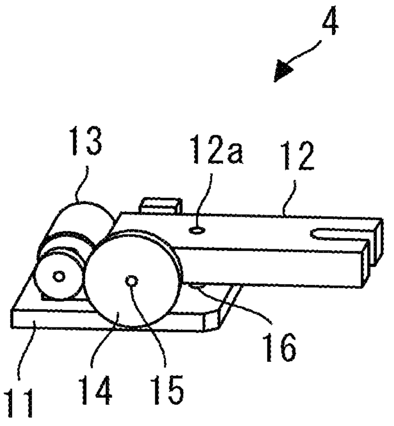
FIG. 3 is a perspective view showing an example of a guide device.
Figure 4:
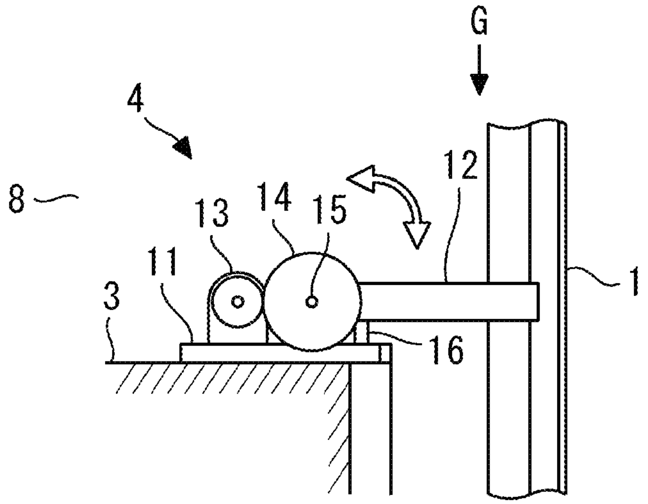
FIG. 4 is a diagram showing an F-F section of FIG. 1.

FIG. 3 is a perspective view showing an example of the guide device 4. FIG. 4 is a diagram showing an F-F section of FIG. 1. The guide device 4 includes a supporting member 11, a guide member 12, a motor 13, a rotating body 14, a shaft 15, and a protrusion 16.

The supporting member 11 is fixed to the car 3. The supporting member 11 supports other members included in the guide device 4. For example, the guide member 12 is supported by the supporting member 11. The motor 13 is supported by the supporting member 11.

The guide member 12 is a member for guiding up-down movement of the car 3. In the example described in this embodiment, the car 3 moves in the horizontal direction as well. In order to enable the movement of the car 3 in the horizontal direction, the guide member 12 is displaceable to a first position and a second position in a state in which the guide member 12 is supported by the supporting member 11. The first position is a position for restricting the movement of the car 3 in the horizontal direction and guiding the up-down movement of the car 3.

Figure 5:
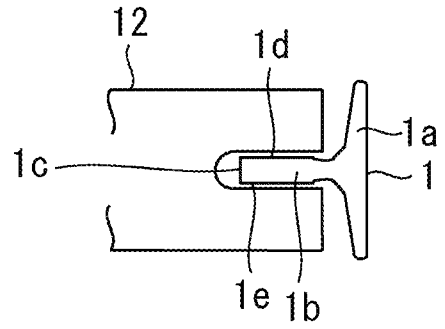
FIG. 5 is a diagram of a guide member and a guide rail viewed from a G direction in FIG. 4.

FIG. 5 is a diagram of the guide member 12 and the guide rail 1 viewed from a G direction in FIG. 4. FIG. 5 shows an example in which the guide member 12 is placed in the first position. As shown in FIG. 5, the guide rail 1 includes a flange section 1*a* and a guide section 1*b*. The guide section 1*b* projects to the car 3 side from the flange section 1*a*. An end face 1*c* and side surfaces 1*d* and 1*e* are formed in the guide section 1*b*. The end face 1*c* is a vertical surface facing the car 3 side in the plan view. The side surface 1*d* is a vertical surface perpendicular to the end face 1*c*. The side surface 1*e* is a vertical surface perpendicular to the end face 1*c*. The side surface 1*d* and the side surface 1*e* face opposite directions each other.

When the guide member 12 is placed in the first position, the guide member 12 is opposed to the end face 1*c* and the side surfaces 1*d* and 1*e*. That is, the guide member 12 placed in the first position is opposed to the guide section 1*b* from three directions in the plan view to thereby restrict the movement of the car 3 in the horizontal direction and guide the up-down movement of the car 3.

The protrusion 16 is an example of means for receiving a load in the horizontal direction acting on the guide member 12 placed in the first position. The protrusion 16 is provided on the supporting member 11. The protrusion 16 projects upward from the supporting member 11. In the example described in this embodiment, a through-hole 12*a* is formed in the guide member 12 to match the position of the protrusion 16. If the guide member 12 is placed in the first position, at least a part of the protrusion 16 is placed on the inside of the through-hole 12*a*. That is, if the guide member 12 is placed in the first position, the protrusion 16 is surrounded by the guide member 12. Therefore, even if force in the horizontal direction acts on the guide member 12, the force can be received by the protrusion 16. Note that the protrusion 16 may pass through the through-hole 12*a* when the guide member 12 is placed in the first position.

Figure 6:
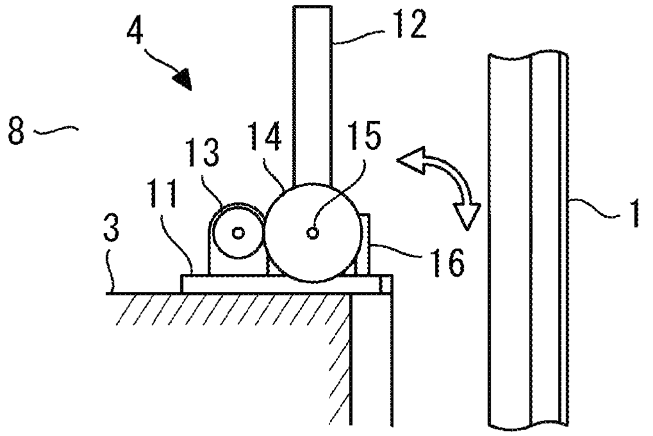
FIG. 6 is a diagram showing the F-F section of FIG. 1.

The second position is a position for not hindering the car 3 from moving in the horizontal direction. FIG. 6 is a diagram showing the F-F section of FIG. 1. FIG. 6 shows an example in which the guide member 12 is placed in the second position. In the example described in this embodiment, the guide member 12 rotates around the shaft 15 with respect to the supporting member 11 to thereby be displaced from the first position to the second position. Similarly, the guide member 12 is displaced from the second position to the first position. The guide member 12 placed in the second position does not come into contact with the guide rail 1 when the car 3 moves in the horizontal direction.

The motor 13 and the rotating body 14 are examples of means for displacing the guide member 12 to the first position and the second position. The motor 13 generates a driving force for displacing the guide member 12. When an output shaft of the motor 13 rotates, the rotating body 14 rotates. A method for transmitting the rotation of the output shaft of the motor 13 to the rotating body 14 may be any method. A gear may be formed in the rotating body 14. A cord-like member such as a belt may be wound on the rotating body 14.

The rotating body 14 and the guide member 12 are fixed to the shaft 15. The shaft 15 is rotatably supported by the supporting member 11. When the rotating body 14 rotates, the shaft 15 rotates and the guide member 12 is displaced. FIG. 6 shows an example in which the guide member 12 placed in the second position is placed vertically on the car 3. For example, when the guide member 12 is placed in the second position, the entire guide member 12 is placed right above the car 3.

The configurations of the guide devices 5 to 7 are basically the same as the configuration of the guide device 4. For example, the guide device 5 is equivalent to a device obtained by arranging the guide device 4 reversely in the up-down direction. The guide device 6 is equivalent to a device obtained by arranging the guide device 4 reversely in the left-right direction. The guide device 7 is equivalent to a device obtained by arranging the guide device 6 reversely in the up-down direction.

Note that, whereas the guide devices 4 and 5 are opposed to the guide rail 1, the guide devices 6 and 7 are opposed to the guide rail 2. For example, the guide device 6 includes elements equivalent to the supporting member 11, the guide member 12, the motor 13, the rotating body 14, the shaft 15, and the protrusion 16.

When the guide member of the guide device 6 is placed in the first position, the guide member is opposed to a guide section of the guide rail 2 from three directions in the plan view. Consequently, the guide member of the guide device 6 restricts the movement of the car 3 in the horizontal direction and guides the up-down movement of the car 3. If the guide member of the guide device 6 is placed in the second position, the guide member of the guide device 6 does not come into contact with the guide rail 2 when the car 3 moves in the horizontal direction. For example, the entire guide member of the guide device 6 placed in the second position is placed right above the car 3.

In the elevator device described in this embodiment, if the guide members of the guide devices 4 to 7 are placed in the second position, the guide devices 4 to 7 do not come into contact with the guide rails 1 and 2 when the car 3 moves in the horizontal direction. For example, the car 3 can move in any direction of the B to E directions shown in FIG. 1. In the example described in this embodiment, it is unnecessary to drive the guide rails 1 and 2 in order to bring the car 3 into a movable state in the horizontal direction. Therefore, it is unnecessary to provide, in the shaft 8, a mechanism for driving the guide rails 1 and 2. It is possible to reduce a period and expenses for construction.

Figure 7:
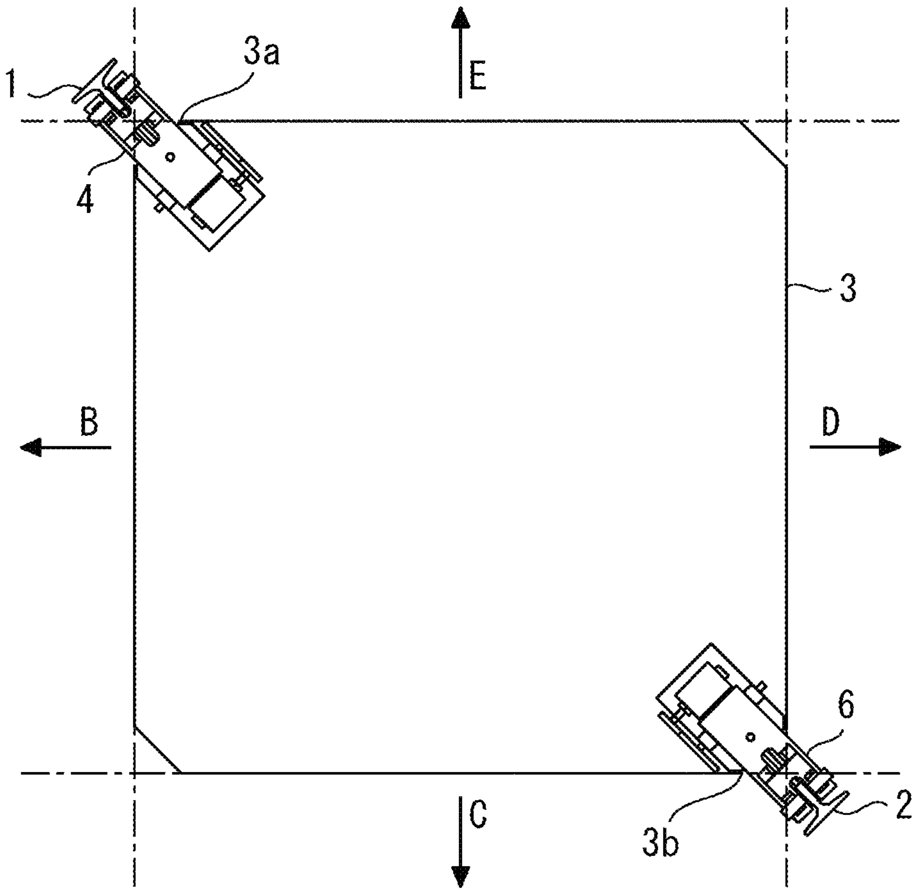
FIG. 7 is a diagram showing another example of the elevator device in the first embodiment.
Figure 8:
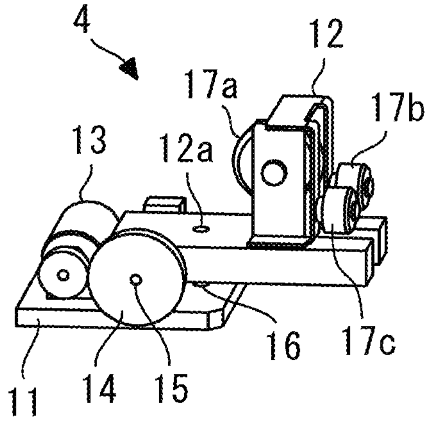
FIG. 8 is a perspective view showing another example of the guide device.

FIG. 7 is a diagram showing another example of the elevator device in the first embodiment. The elevator device shown in FIG. 7 is different from the example shown in FIG. 1 in the configurations of the guide devices 4 to 7. FIG. 8 is a perspective view showing another example of the guide device 4. The configurations of the guide devices 5 to 7 are basically the same as the configuration of the guide device 4.

In the example shown in FIG. 8, the guide device 4 includes the supporting member 11, the guide member 12, the motor 13, the rotating body 14, the shaft 15, and the protrusion 16. The guide device 4 shown in FIG. 8 is different from the guide device 4 shown in FIG. 3 in that the guide member 12 includes rollers 17*a* to 17*c*.

Figure 9:
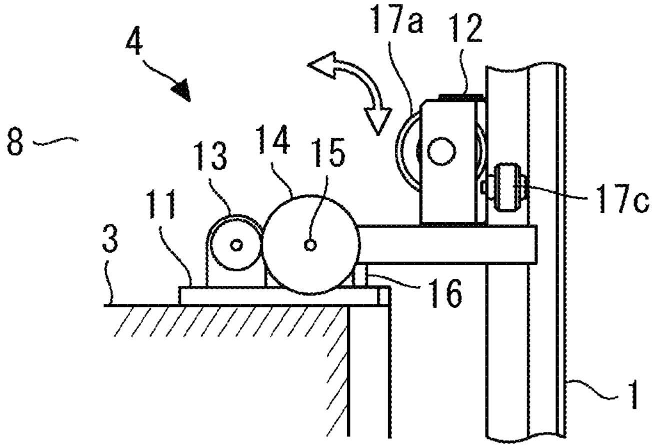
FIG. 9 shows an example in which the guide member is placed in a first position.

In the guide device 4 shown in FIG. 8 as well, the guide member 12 is displaced to the first position and the second position in a state in which the guide member 12 is supported by the supporting member 11. FIG. 9 shows an example in which the guide member 12 is placed in the first position. FIG. 9 is a sectional view equivalent to FIG. 4.

When the guide member 12 is placed in the first position, the guide member 12 is opposed to the end face 1*c* and the side surfaces 1*d* and 1*e*. Specifically, when the guide member 12 is placed in the first position, the roller 17*a* comes into contact with the end face 1*c*. Similarly, the roller 17*b* comes into contact with the side surface 1*d*. The roller 17*c* comes into contact with the side surface 1*e*. The guide member 12 placed in the first position comes into contact with the guide section 1*b* from three directions in the plan view in this way to thereby restrict the movement of the car 3 in the horizontal direction and guide the up-down movement of the car 3. Note that, if the guide member 12 is placed in the first position, the rollers 17*a* to 17*c* rotate according to the up-down movement of the car 3.

Figure 10:
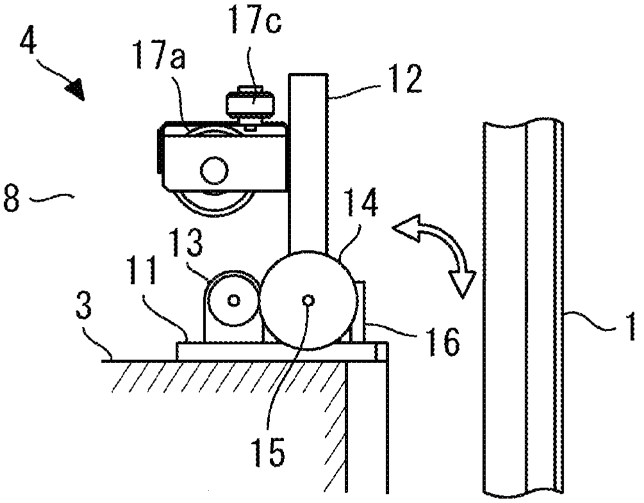
FIG. 10 shows an example in which the guide member is placed in a second position.

FIG. 10 shows an example in which the guide member 12 is placed in the second position. FIG. 10 is a sectional view equivalent to FIG. 6. In the examples shown in FIG. 8 to FIG. 10 as well, the guide member 12 rotates around the shaft 15 with respect to the supporting member 11 to thereby be displaced from the first position to the second position. Similarly, the guide member 12 is displaced from the second position to the first position. The guide member 12 placed in the second position does not come into contact with the guide rail 1 when the car 3 moves in the horizontal direction. For example, when the guide member 12 is placed in the second position, the entire guide member 12 is placed right above the car 3.

Second Embodiment

Figure 11:
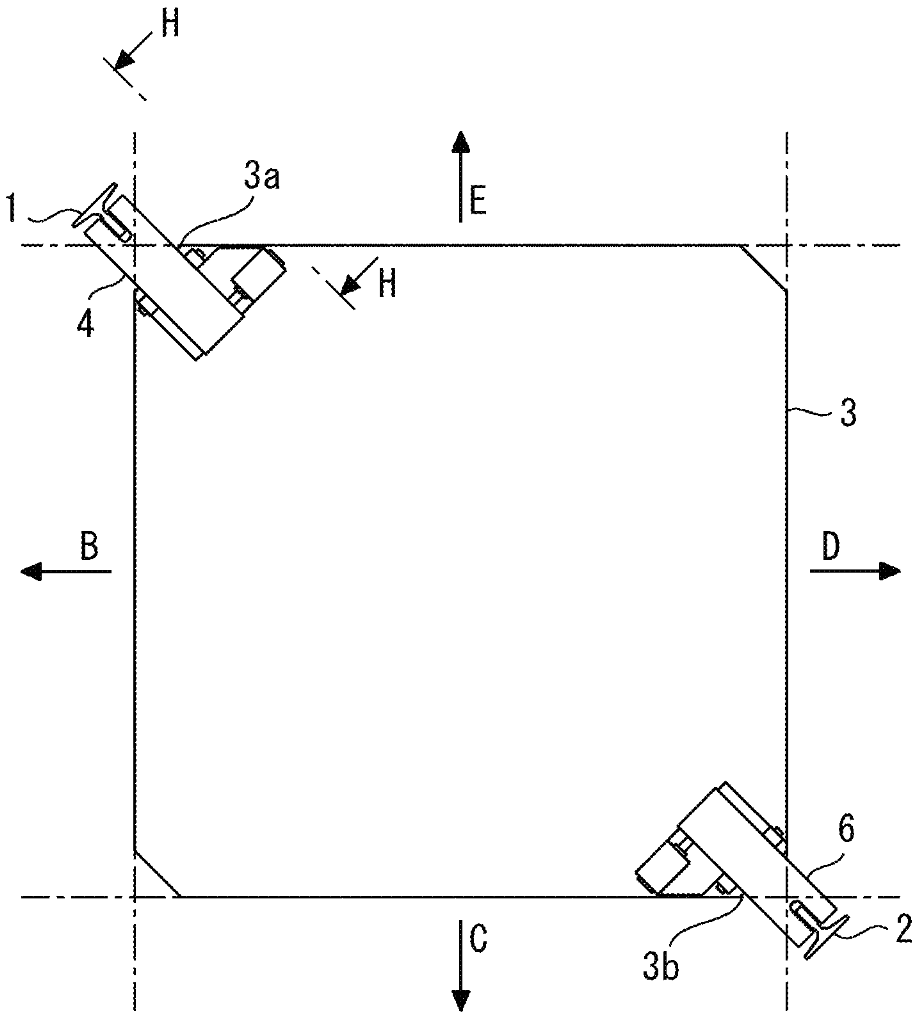
FIG. 11 is a plan view showing an example of the elevator device in a second embodiment.

FIG. 11 is a plan view showing an example of the elevator device in a second embodiment. Like the elevator device disclosed in the first embodiment, the elevator device described in this embodiment includes the guide rails 1 and 2, the car 3, and the guide devices 4 to 7. The elevator device described in this embodiment is different from the example disclosed in the first embodiment in the configurations of the guide devices 4 to 7. Note that the configurations of the guide devices 5 to 7 are basically the same as the configuration of the guide device 4.

Figure 12:
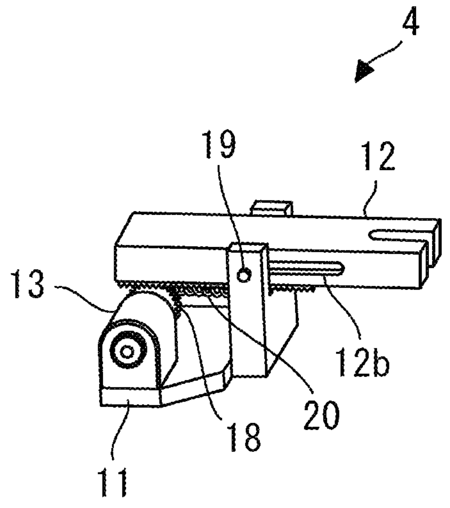
FIG. 12 is a perspective view showing an example of the guide device.
Figure 13:
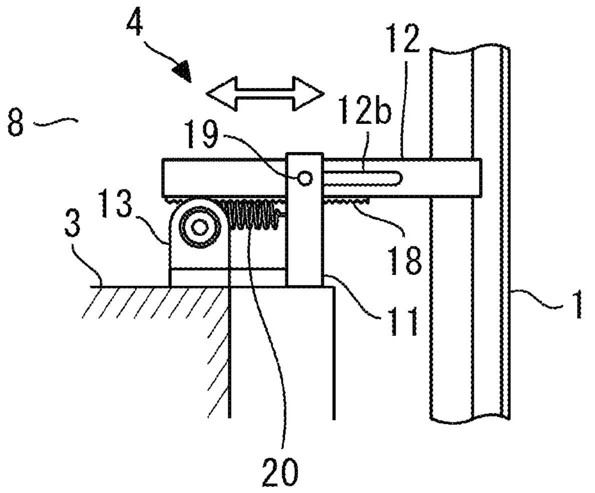
FIG. 13 is a diagram showing an H-H section of FIG. 11.

FIG. 12 is a perspective view showing an example of the guide device 4. FIG. 13 is a diagram showing an H-H section of FIG. 11. The guide device 4 includes the supporting member 11, the guide member 12, the motor 13, a rack and pinion mechanism 18, a supporting shaft 19, and a spring 20.

The supporting member 11 and the guide member 12 have the same functions as the functions disclosed in the first embodiment. For example, the supporting member 11 supports other members included in the guide device 4. In order to enable the movement of the car 3 in the horizontal direction, the guide member 12 is displaceable to the first position and the second position in a state in which the guide member 12 is supported by the supporting member 11. FIG. 13 shows an example in which the guide member 12 is placed in the first position. The guide member 12 placed in the first position is opposed to the end face 1*c* and the side surfaces 1*d* and 1*e* to thereby restrict the movement of the car 3 in the horizontal direction and guide the up-down movement of the car 3.

Figure 14:
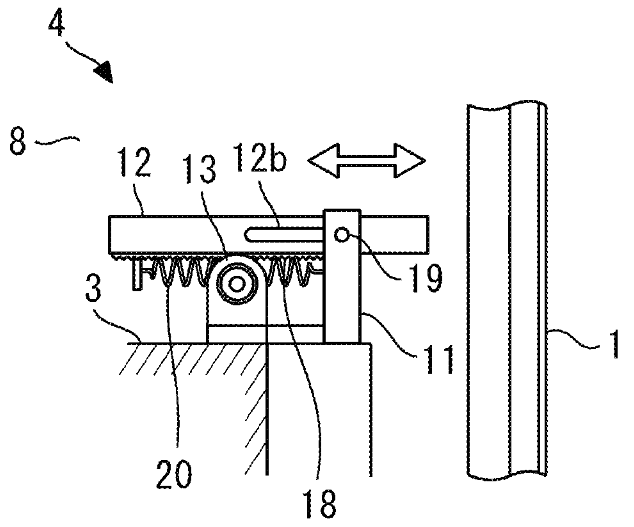
FIG. 14 shows an example in which the guide member is placed in the second position.

FIG. 14 shows an example in which the guide member 12 is placed in the second position. FIG. 14 is a diagram showing the H-H section of FIG. 11. In the example described in this embodiment, the guide member 12 slides in a horizontal direction with respect to the supporting member 11 to thereby be displaced from the first position to the second position. Similarly, the guide member 12 is displaced from the second position to the first position. The guide member 12 placed in the second position does not come into contact with the guide rail 1 when the car 3 moves in the horizontal direction.

The motor 13, the rack and pinion mechanism 18, and the supporting shaft 19 are examples of means for displacing the guide member 12 to the first position and the second position. The motor 13 generates a driving force for displacing the guide member 12. A pinion provided in the output shaft of the motor 13 and a rack provided on the lower surface of the guide member 12 mesh with each other, whereby a rotary motion of the output shaft of the motor 13 is converted into a linear motion of the guide member 12. The supporting shaft 19 is supported by the supporting member 11. The supporting shaft 19 passes through a slot 12*b* formed in the guide member 12. FIG. 14 shows an example in which the guide member 12 is displaced to separate from the guide rail 1 to thereby be placed in the second position. The entire guide member 12 placed in the second position may be placed right above the car 3.

The spring 20 is an example of means for receiving a load in the horizontal direction acting on the guide member 12 placed in the first position. The spring 20 is provided between the supporting member 11 and the guide member 12. The spring 20 always presses the guide member 12 so that the guide member 12 is placed in the first position. Therefore, even if force in the horizontal direction acts on the guide member 12, the force can be received by the spring 20. Note that another pressing member having the same function as the function of the spring 20 may be included in the guide device 4.

Figure 15:
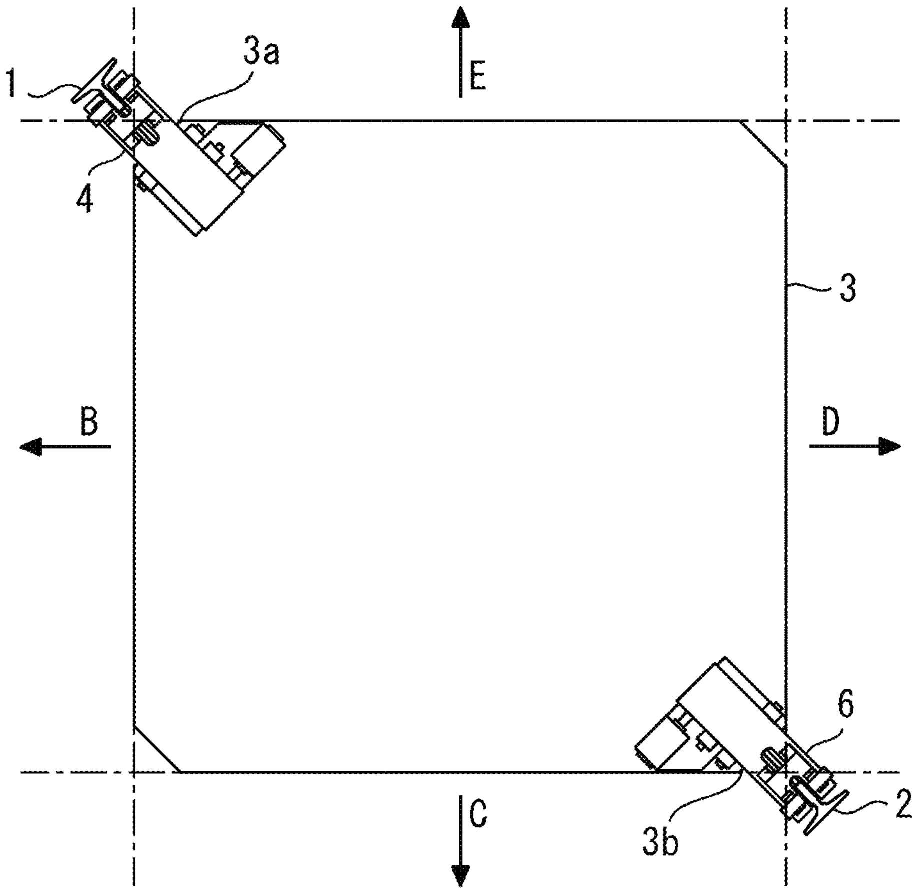
FIG. 15 is a diagram showing another example of the elevator device in the second embodiment.
Figure 16:
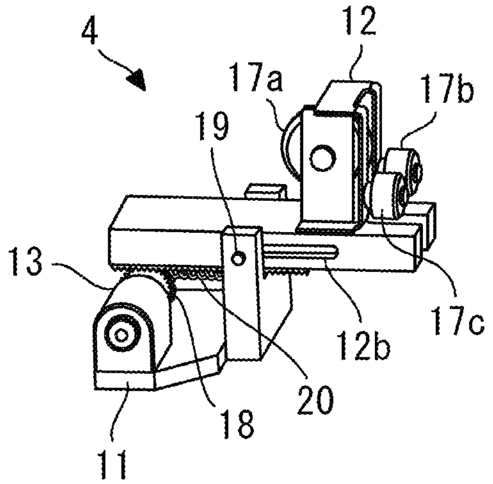
FIG. 16 is a perspective view showing another example of the guide device.

FIG. 15 is a diagram showing another example of the elevator device in the second embodiment. The elevator device shown in FIG. 15 is different from the example shown in FIG. 11 in the configurations of the guide devices 4 to 7. FIG. 16 is a perspective view showing another example of the guide device 4. The configurations of the guide devices 5 to 7 are basically the same as the configuration of the guide device 4.

In the example shown in FIG. 16, the guide device 4 includes the supporting member 11, the guide member 12, the motor 13, the rack and pinion mechanism 18, the supporting shaft 19, and the spring 20. The guide device 4 shown in FIG. 16 is different from the guide device 4 shown in FIG. 12 in that the guide member 12 includes the rollers 17*a* to 17*c*.

Figure 17:
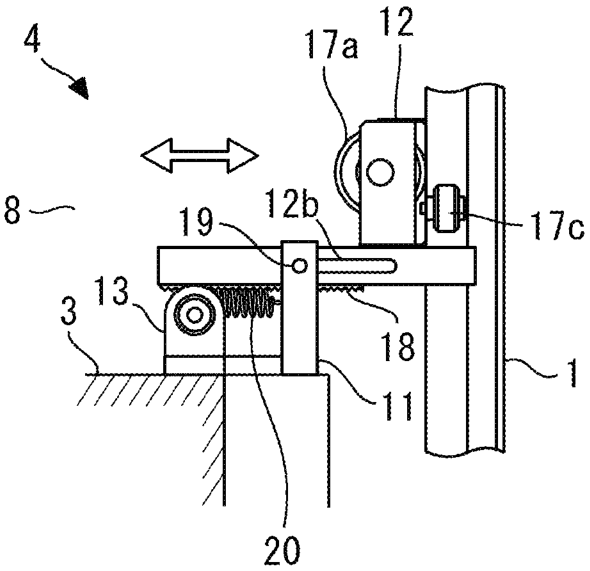
FIG. 17 shows an example in which the guide member is placed in the first position.

In the guide device 4 shown in FIG. 16 as well, the guide member 12 is displaced to the first position and the second position in a state in which the guide member 12 is supported by the supporting member 11. FIG. 17 shows an example in which the guide member 12 is placed in the first position. FIG. 17 is a sectional view equivalent to FIG. 13.

When the guide member 12 is placed in the first position, the guide member 12 is opposed to the end face 1*c* and the side surfaces 1*d* and 1*e*. Specifically, when the guide member 12 is placed in the first position, the roller 17*a* comes into contact with the end face 1*c*. Similarly, the roller 17*b* comes into contact with the side surface 1*d*. The roller 17*c* comes into contact with the side surface 1*e*. The guide member 12 placed in the first position comes into contact with the guide section 1*b* from three directions in the plan view to thereby restrict the movement of the car 3 in the horizontal direction and guide the up-down movement of the car 3. Note that, if the guide member 12 is placed in the first position, the rollers 17*a* to 17*c* rotate according to the up-down movement of the car 3.

Figure 18:
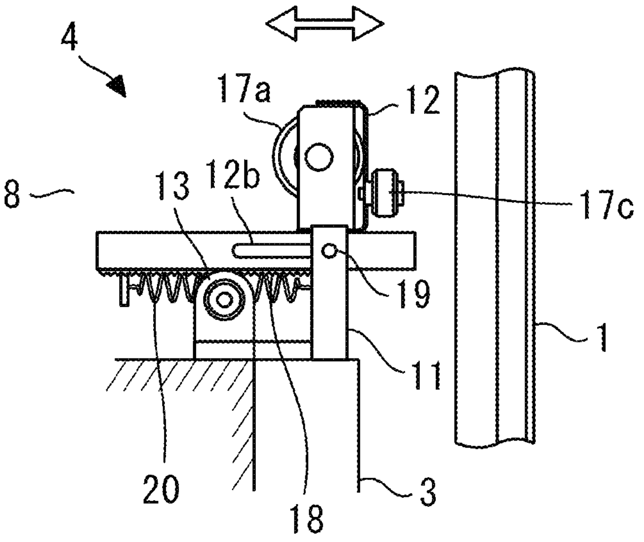
FIG. 18 shows an example in which the guide member is placed in the second position.

FIG. 18 shows an example in which the guide member 12 is placed in the second position. FIG. 18 is a sectional view equivalent to FIG. 14. In the examples shown in FIG. 16 to FIG. 18 as well, the guide member 12 slides in the horizontal direction with respect to the supporting member 11 to thereby be displaced from the first position to the second position. Similarly, the guide member 12 is displaced from the second position to the first position. The guide member 12 placed in the second position does not come into contact with the guide rail 1 when the car 3 moves in the horizontal direction. The entire guide member 12 placed in the second position may be placed right above the car 3.

In the first and second embodiments, the example in which the car 3 has the square shape in the plan view is explained. The car 3 may have a polygonal shape other than the square shape in the plan view. For example, the car 3 may have a hexagonal shape in the plan view. In such a case, it is preferable that the guide device 4 is provided at one corner of the polygonal shape and the guide device 6 is provided at a corner which is the opposite corner of the corner.

In the first and second embodiments, the example in which the guide member 12 is displaced along a straight line connecting the guide rails 1 and 2 in the plan view is explained, however, this is an example. The guide member 12 may be displaced along a straight line forming a certain angle with the straight line connecting the guide rails 1 and 2. If the guide member 12 cannot prevent the movement of the car 3 in the horizontal direction, the guide member 12 may be displaced along a straight line orthogonal to the straight line connecting the guide rails 1 and 2 in the plan view.

INDUSTRIAL APPLICABILITY

The present invention can be applied to an elevator device in which a car is movable in the horizontal direction.

REFERENCE SIGNS LIST

1-2 guide rail, 1*a* flange section, 1*b* guide section, 1*c* end face, 1*d*-1*e* side surface, 3 car, 3*a*-3*b* corner, 4-7 guide device, 8 shaft, 11 supporting member, 12 guide member, 12*a* through-hole, 12*b* slot, 13 motor, 14 rotating body, 15 shaft, 16 protrusion, 17*a*-17*c* roller, 18 rack and pinion mechanism, 19 supporting shaft 20 spring

The invention claimed is:

1. An elevator device comprising:
a guide rail in an elevator shaft;
a car that moves up and down in the elevator shaft along the guide rail; and
a guide unit on the car to be opposed to the guide rail, wherein
the car is movable in a horizontal direction at a specific height,
a first side surface and a second side surface facing opposite directions to each other and an end face are formed in the guide rail,
the guide unit includes
a support fixed to the car, and
a guide supported by the support, and
the guide is displaceable to
a first position where the guide is opposed to the end face, the first side surface, and the second side surface of the guide rail to thereby restrict movement of the car in the horizontal direction and guide up-down movement of the car, and
a second position where the guide does not come into contact with the guide rail when the car moves in the horizontal direction,
wherein the guide is rotatable around a shaft which is perpendicular to a length of the guide rail which is a longest dimension of the guide rail to thereby be displaced to the first position and the second position,
wherein the guide includes two arms which are on opposite sides of the guide rail when the guide is in the first position,
the two arms are parallel to each other in both the first position and the second position,
the guide unit further includes a protrusion on the support and projecting upward, and
when the guide is placed in the first position, the protrusion is surrounded by the guide.

2. The elevator device according to claim 1, wherein the entire guide is placed right above the car in the second position.

3. The elevator device according to claim 1, wherein the car has a polygonal shape in a plan view, and the guide unit is at a corner of the polygonal shape.

4. The elevator device according to claim 1, further comprising a second guide rail in the elevator shaft, and a second guide on the car to be opposed to the second guide rail, wherein the car has, in a plan view, a polygonal shape having a first corner and a second corner which is an opposite corner of the first corner, the guide unit is at the first corner, and the second guide is at the second corner.

5. The elevator device according to claim 1, wherein:

the guide is single piece such that the two arms of the guide are fixed in each position relative to each other.

6. An elevator device comprising:

a guide rail in an elevator shaft;

a car that moves up and down in the elevator shaft along the guide rail; and a guide unit on the car to be opposed to the guide rail, wherein the car is movable in a horizontal direction at a specific height, a first side surface and a second side surface facing opposite directions to each other and an end face are formed in the guide rail, the guide unit includes a support fixed to the car, and a guide supported by the support, and the guide is displaceable to a first position where the guide is opposed to the end face, the first side surface, and the second side surface of the guide rail to thereby restrict movement of the car in the horizontal direction and guide up-down movement of the car, and a second position where the guide does not come into contact with the guide rail when the car moves in the horizontal direction, wherein:

the guide rotates around a shaft to thereby be displaced to the first position and the second position, the guide unit further includes a protrusion on the support and projecting upward, and when the guide is placed in the first position, the protrusion is surrounded by the guide.

7. An elevator device comprising:

a guide rail in an elevator shaft, the guide rail including a flange section and a guide section, different from the flange section and perpendicular to the flange section, the guide section connected to a middle portion of the flange section along a length of the guide rail;

a car that moves up and down in the elevator shaft along the guide rail; and a guide unit on the car to be opposed to the guide rail, wherein the car is movable in a horizontal direction at a specific height, a first side surface of the guide section and a second side surface of the guide section facing opposite directions to each other and being connected to the flange section of the guide rail, the guide unit includes a support fixed to the car, and a guide supported by the support, and the guide is displaceable to a first position where the guide is opposed to the flange section, the first side surface of the guide section, and the second side surface of the guide section to thereby restrict movement of the car in the horizontal direction and guide up-down movement of the car, and a second position where the guide does not come into contact with the guide rail when the car moves in the horizontal direction, wherein the guide rotates as a single unit around a shaft to thereby be displaced to the first position and the second position, wherein the guide includes two arms which are on opposite sides of the guide rail when the guide is in the first position, the two arms are parallel to each other in both the first position and the second position, the guide unit further includes a protrusion on the support and projecting upward, and when the guide is placed in the first position, the protrusion is surrounded by the guide.

* * * * *